US011858671B2

(12) United States Patent
Hartman et al.

(10) Patent No.: US 11,858,671 B2
(45) Date of Patent: *Jan. 2, 2024

(54) POUCH FORMING MOLD CONFIGURATION, AND METHOD

(71) Applicant: Mespack Cloud, LLC, Des Plaines, IL (US)

(72) Inventors: Donn D. Hartman, Hawthorn Woods, IL (US); Alexander J. Waterman, Mount Prospect, IL (US); Michael Gregory Alcazar, Des Plaines, IL (US); Anthony Crivolio, Elk Grove Village, IL (US)

(73) Assignee: Mespack Cloud, LLC, Des Plaines, IL (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/477,233

(22) Filed: Sep. 16, 2021

(65) Prior Publication Data

US 2022/0002010 A1     Jan. 6, 2022

Related U.S. Application Data

(63) Continuation of application No. 16/885,699, filed on May 28, 2020, now Pat. No. 11,148,837, which is a
(Continued)

(51) Int. Cl.
*B29C 65/00* (2006.01)
*B65B 3/02* (2006.01)
(Continued)

(52) U.S. Cl.
CPC ............. *B65B 3/022* (2013.01); *B29C 51/30* (2013.01); *B65B 3/04* (2013.01); *B65B 5/108* (2013.01);
(Continued)

(58) Field of Classification Search
CPC ...... B29C 51/10; B29C 51/225; B29C 51/266; B29C 51/28; B29C 51/36
See application file for complete search history.

(56) References Cited

U.S. PATENT DOCUMENTS 2,339,286 A     1/1944  Moule
3,218,776 A    11/1965  Cloud
(Continued)

FOREIGN PATENT DOCUMENTS

EP     0516393 A1   12/1992
EP     1648684 A1    4/2006
(Continued)

OTHER PUBLICATIONS

European Patent Office, International Search Report, in International Application No. PCT/US2017/045785 (dated Nov. 8, 2017).
(Continued)

*Primary Examiner* — Joseph S Del Sole
*Assistant Examiner* — Thu-Khanh T. Nguyen
(74) *Attorney, Agent, or Firm* — Leydig, Voit & Mayer, Ltd.

(57) ABSTRACT

A mold configuration for forming a pocket in a film comprising: a film support surface; a perimeter edge at said film support surface; wall surfaces inward of the perimeter edge defining a mold cavity; the wall surfaces including transition wall surfaces extending to a bottom wall surface; and a plateau surface inward of the perimeter edge. In one form, the perimeter edge includes sharp corner profile perimeter edge portions defining at least one sharp corner profile. A method of forming a pouch, includes using the disclosed mold configuration.

23 Claims, 9 Drawing Sheets

Related U.S. Application Data continuation of application No. 15/670,794, filed on Aug. 7, 2017, now Pat. No. 10,703,515.

(60) Provisional application No. 62/410,456, filed on Oct. 20, 2016, provisional application No. 62/372,050, filed on Aug. 8, 2016.

(51) Int. Cl.
| | |
|---|---|
| *B65D 65/46* | (2006.01) |
| *B65D 75/32* | (2006.01) |
| *B29C 51/30* | (2006.01) |
| *B65D 81/20* | (2006.01) |
| *B65B 3/04* | (2006.01) |
| *B65B 5/10* | (2006.01) |
| *B65B 51/28* | (2006.01) |
| *B29C 51/22* | (2006.01) |
| *B29C 51/10* | (2006.01) |
| *B29C 51/36* | (2006.01) |
| *B29C 51/26* | (2006.01) |
| *B29L 31/00* | (2006.01) |
| *B29K 21/00* | (2006.01) |
| *B65B 51/02* | (2006.01) |
| *B65B 61/06* | (2006.01) |

(52) U.S. Cl.
CPC .............. *B65B 51/28* (2013.01); *B65D 65/46* (2013.01); *B65D 75/325* (2013.01); *B65D 81/2061* (2013.01); *B29C 51/10* (2013.01); *B29C 51/225* (2013.01); *B29C 51/266* (2013.01); *B29C 51/36* (2013.01); *B29C 2791/006* (2013.01); *B29C 2793/009* (2013.01); *B29K 2021/003* (2013.01); *B29K 2831/04* (2013.01); *B29K 2995/0062* (2013.01); *B29L 2031/7128* (2013.01); *B29L 2031/7174* (2013.01); *B65B 51/02* (2013.01); *B65B 61/06* (2013.01); *B65D 75/327* (2013.01)

(56) References Cited

U.S. PATENT DOCUMENTS

| | | |
|---|---|---|
| 4,271,739 A | 6/1981 | Chung |
| D452,143 S | 12/2001 | Ghatlia et al. |
| 6,719,139 B1 | 4/2004 | Foos et al. |
| D599,056 S | 8/2009 | Schwartz et al. |
| D599,057 S | 8/2009 | Beckholt et al. |
| D608,049 S | 1/2010 | Schwartz et al. |
| D639,184 S | 6/2011 | Nixon |
| D648,481 S | 11/2011 | Nixon |
| D651,340 S | 12/2011 | Heidel et al. |
| D662,658 S | 6/2012 | Nixon |
| 8,539,743 B2 | 9/2013 | Rapparini |
| 8,662,880 B2 | 3/2014 | Fowler et al. |
| D732,735 S | 6/2015 | Nixon et al. |
| 2006/0284349 A1 | 12/2006 | Castiglioni et al. |
| 2013/0181382 A1 | 7/2013 | Aich et al. |
| 2014/0154350 A1 | 6/2014 | Hammond et al. |

FOREIGN PATENT DOCUMENTS

| | | |
|---|---|---|
| WO | WO 00/55044 | 9/2000 |
| WO | WO 00/73146 A2 | 12/2000 |
| WO | WO 2005/014262 A1 | 2/2005 |
| WO | WO 2006/076705 A2 | 7/2006 |
| WO | WO 2015/011683 A1 | 1/2015 |
| WO | WO 2016/045792 A1 | 3/2016 |

OTHER PUBLICATIONS

European Patent Office, Written Opinion of the International Searching Authority, in International Application No. PCT/US2017/045785 (dated Nov. 8, 2017).

U.S. Appl. No. 16/885,699, filed May 28, 2020, U.S. Pat. No. 11,148,837.

U.S. Appl. No. 15/670,794, filed Aug. 7, 2017, U.S. Pat. No. 10,703,515.

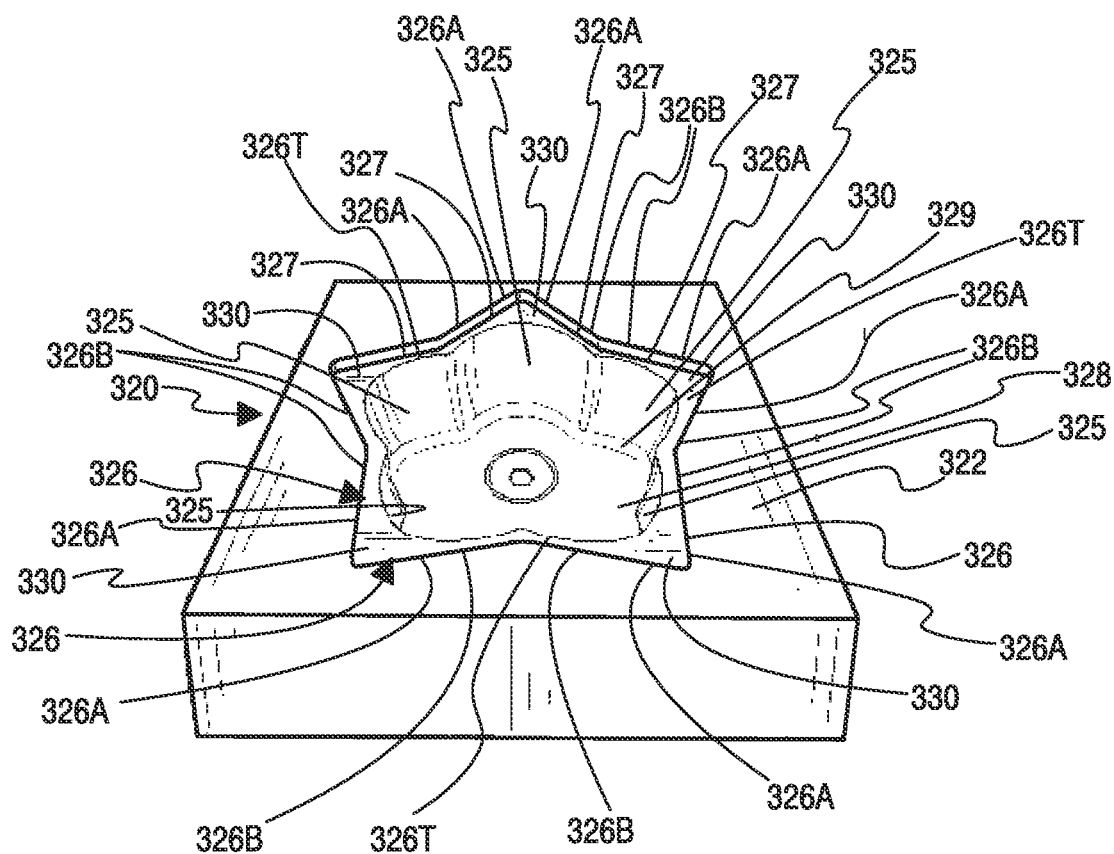
FIG. 13
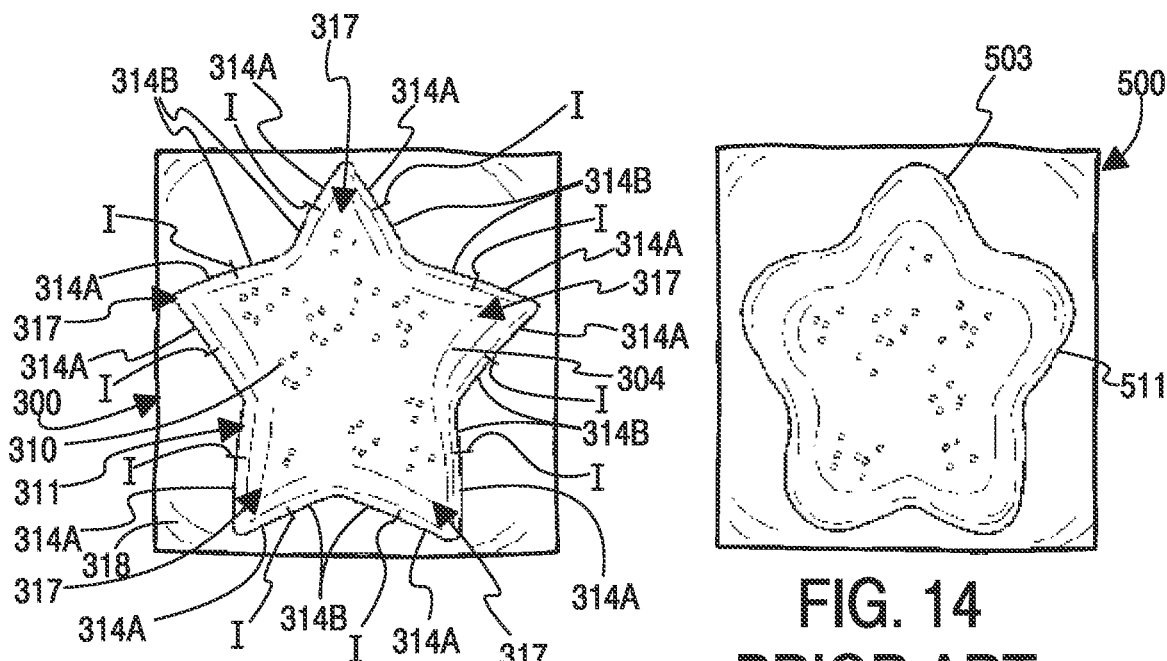
FIG. 15
FIG. 14
PRIOR ART

POUCH FORMING MOLD CONFIGURATION, AND METHOD

This application claims priority, pursuant to Title 35 USC, Sec. 120, to U.S. nonprovisional patent application Ser. No. 16/885,699, filed May 28, 2020, entitled "Pouch Forming Mold Configuration, and Method," now U.S. Pat. No. 11,148,837 issued Dec. 19, 2021, which, in turn, claims priority to U.S. nonprovisional application Ser. No. 15/670,794, entitled "Pouch Forming Mold Configuration Method and Pouch, filed Aug. 7, 2017, now U.S. Pat. No. 10,703,515 issued Jul. 7, 2020, which, in turn, claims priority pursuant to Title 35 USC Sec. 119(e) to U.S. provisional application Ser. No. 62/372,050, filed Aug. 8, 2016, and U.S. provisional application Ser. No. 62/410,456, filed Oct. 20, 2016, the entire contents of which are hereby incorporated by reference herein as if fully set forth.

TECHNICAL FIELD

This disclosure relates generally to a forming system for making flexible, polymeric pouches containing a consumable product component from continuous webs of film. More particularly, it relates to the apparatus and method of forming and filling pouches of unique shape and to the resultant pouches.

Flexible pouches made of polymeric film and filled with a consumable product are commonly produced on equipment having an array of pouch forming, mold configurations. These pouch forming mold configurations are often incorporated into a rotating drum, or axially movable platen. Examples of such forming, filling and sealing systems include U.S. Pat. No. 3,218,776, issued Nov. 23, 1965 to Charles E. Cloud, and U.S. Pat. No. 9,162,413, issued to Cloud Packaging Solutions, LLC, the entire contents of which are hereby incorporated herein by reference as if fully set forth herein. Other examples include U.S. Publication No. 2014/0154350 and U.S. Pat. No. 8,662,880.

BACKGROUND

Machines or systems are known for forming flexible sealed pouches or packages containing a consumable product. Such pouches may be made from two continuous films in which a first or base film is vacuum formed to define a pocket to be filled with one or more products or materials and subsequently closed by a second or lid film. Some more recent configurations include multiple compartment pouches and pouches in which more than two films are employed. Particularly suitable applications for flexible packages from water soluble film, such as polyvinyl alcohol (PVA) involve manufacture of individual dosage pouches of laundry detergent and/or dish washing detergent, though other commercial applications are also known.

The nature of the forming process, heating a polymeric film and drawing the film into mold configurations defining cavities or depressions in the film support surface necessarily stretches the film in certain areas to conform with the mold cavity profile. This reduces the original thickness in areas of stretch with a resultant film weakening. It is therefore common practice to design the mold configurations with smooth transition sections having large radii corners between adjoining wall portions to minimize excessive localized stretch and consequent strength reduction.

Moreover, the accepted processing limitation established by film suppliers and followed by pouch manufacturers is that a given film typically should not be stretched to more than twice its pre-forming area. That is, the surface area of unformed film overlying a mold configuration cavity should not be expanded to more than twice this original area.

Heretofore, efforts to provide sharp corner profiles in flexible pouches have been limited to low volume profiles utilizing gradually sloped mold surfaces. This approach has had limited application because it limits the internal volume of the pouch, or increases its overall size, leading to increased cost in film material and processing complexity. Such profiles have heretofore been limited to secondary or ancillary pockets affixed to a main pouch made under traditional forming guidelines. Moreover, these secondary or ancillary pockets require an additional film layer further increasing overall material cost and processing complexity.

Thus, with known systems, it was not possible to produce pouches from two film layers with sharp definition corner profiles and adequate volume capacity in an acceptable pouch size. The present disclosure provides apparatus, mold configurations and methodology to produce pouches with sharp corner definition, which will satisfy the previously unfilled need in the industry. It also provides a simplified approach to forming and filling any shape pouch of polymeric material.

SUMMARY

A mold configuration for forming a pocket in a film comprising: a film support surface; a perimeter edge at the film support surface; wall surfaces inward of the perimeter edge defining a mold cavity; the wall surfaces including transition wall surfaces extending to a bottom wall surface; and a plateau surface inward of the perimeter edge. In one form the perimeter edge includes sharp corner profile perimeter edge portions defining at least one sharp corner profile.

A method of forming a pouch having at least one sharp corner profile, using a mold configuration for forming a pocket in a film comprising: a film support surface; a perimeter edge at the film support surface; wall surfaces extending inward of the perimeter edge defining a mold cavity; the wall surfaces including transition wall surfaces extending to a bottom wall surface, the perimeter edge includes sharp corner profile perimeter edge portions defining at least one sharp corner profile; and a plateau surface inward of the sharp corner profile perimeter edge portions; the steps comprising: supporting a base film on the film support surface overlying the mold configuration; applying a vacuum to the mold configuration to cause the base film to form a pocket conforming to the shape of the mold configuration; filling the pocket with at least one product component; adhering a lid film to the base film laterally of the perimeter edge of the mold configuration.

A pressurized product containment pouch of polymeric film, comprising: a base film defining a pocket portion, a lid film defining a lid portion, the films joined about a perimeter seal seam defining a hollow containment chamber containing a product under pressure, the pouch perimeter seal seam including: at least one sharp corner profile comprising straight or slightly curved seal seam portions meeting at an intersection or vertex to form an angle.

DETAILED DESCRIPTION OF THE DRAWINGS

FIG. 13 is a perspective view of a mold configuration in accordance with the disclosure for making another flexible containment pouch in accordance with the disclosure.

FIG. 14 is a containment pouch made employing a prior art mold configuration.

FIG. 15 is a top view of a pouch made in accordance with the disclosure in the mold configuration of FIG. 13.

DETAILED DESCRIPTION OF ILLUSTRATED EMBODIMENTS

Figure 1:
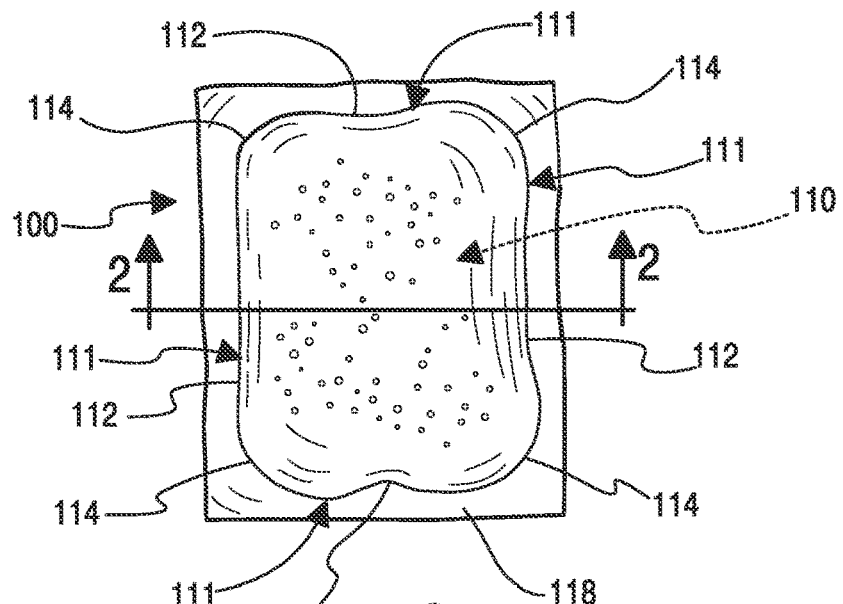
FIG. 1 is a top view of a known flexible containment pouch configuration.
Figure 2:
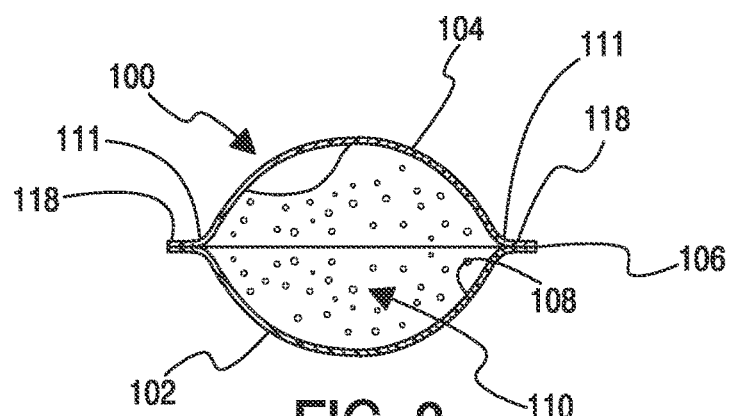
FIG. 2 is a cross-sectional view of the pouch of FIG. 1 taken along the line 2-2 of FIG. 1.
Figure 3:
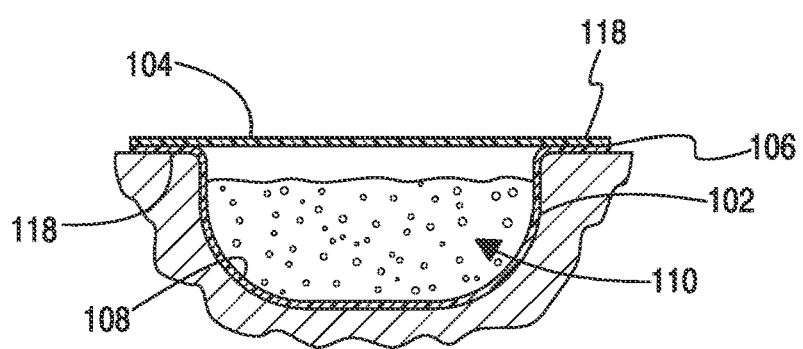
FIG. 3 is a cross-sectional view of the pouch of FIGS. 1 and 2 at an interim stage of manufacture.
Figure 4:
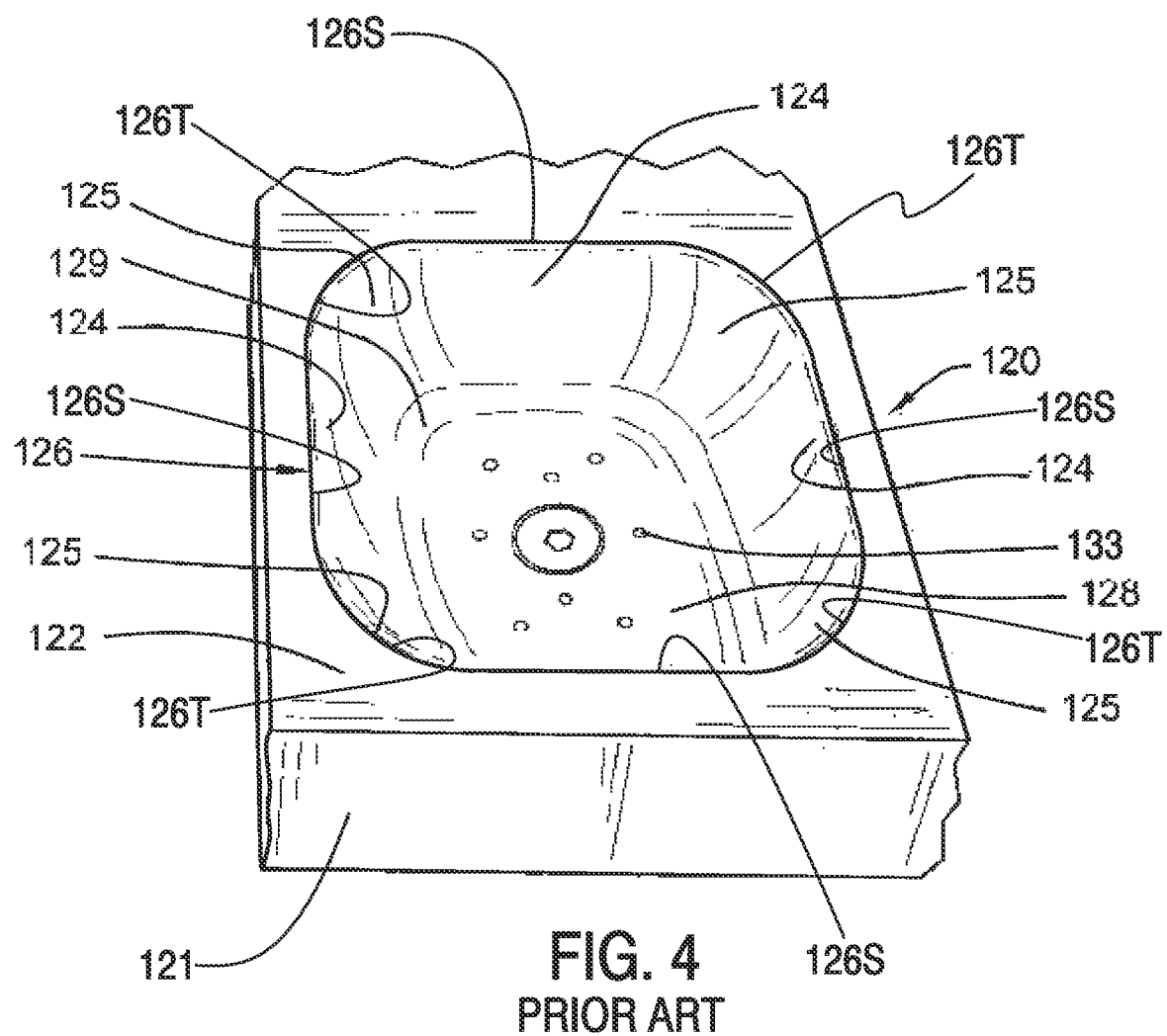
FIG. 4 is a perspective view of a known mold configuration for a pouch forming drum to produce the pouch of FIGS. 1-3.

Turning now to the drawings, FIGS. 1-3 are illustrative of a known flexible containment pouch 100 formed by joinder of two polymeric films. FIG. 4 is illustrative of a conventional mold configuration 120 for producing the pouch of FIGS. 1-3.

The films could be water soluble polyvinyl alcohol, though other films could be used. The films used are "soft" and form "soft" blisters once thermoformed from PVA, polyethylene, or other suitable polymeric film. For such soft types of film, this disclosure provides the means to form pouches with sharp corner profiles, without undo thinning of the film that could compromise strength of the pouch film, possibly causing leakage.

Typical film thicknesses for soft blister pouches are 0.001 inch" (inch) to 0.004" (inch) thick. The formed stock, sometimes called the base film is typically around 0.003" (inch) thick and the lid stock or lid film is typically thinner, usually around 0.002" (inch) thick, though these thicknesses not requisite for the principles of this disclosure. It should be understood that the pouch and apparatus of FIGS. 1-5 are merely exemplary of known technology and are not limiting of the disclosure.

Referring to FIGS. 1-3, pouch 100 includes a base film 102 and a lid film 104 joined along a sealed interface 106. It defines a hollow interior volume containing a product component 110, in this illustration, a liquid composition. The pouch 100 is generally rectangular with a hollow volume defined by a sealed perimeter seal seam 111. Perimeter seal seam 111 includes, generally, straight perimeter side seal seam portions 112 joined by corner seal seam portions 114 defined by a generous radius, for example, ⅜" (inch).

Figure 5:
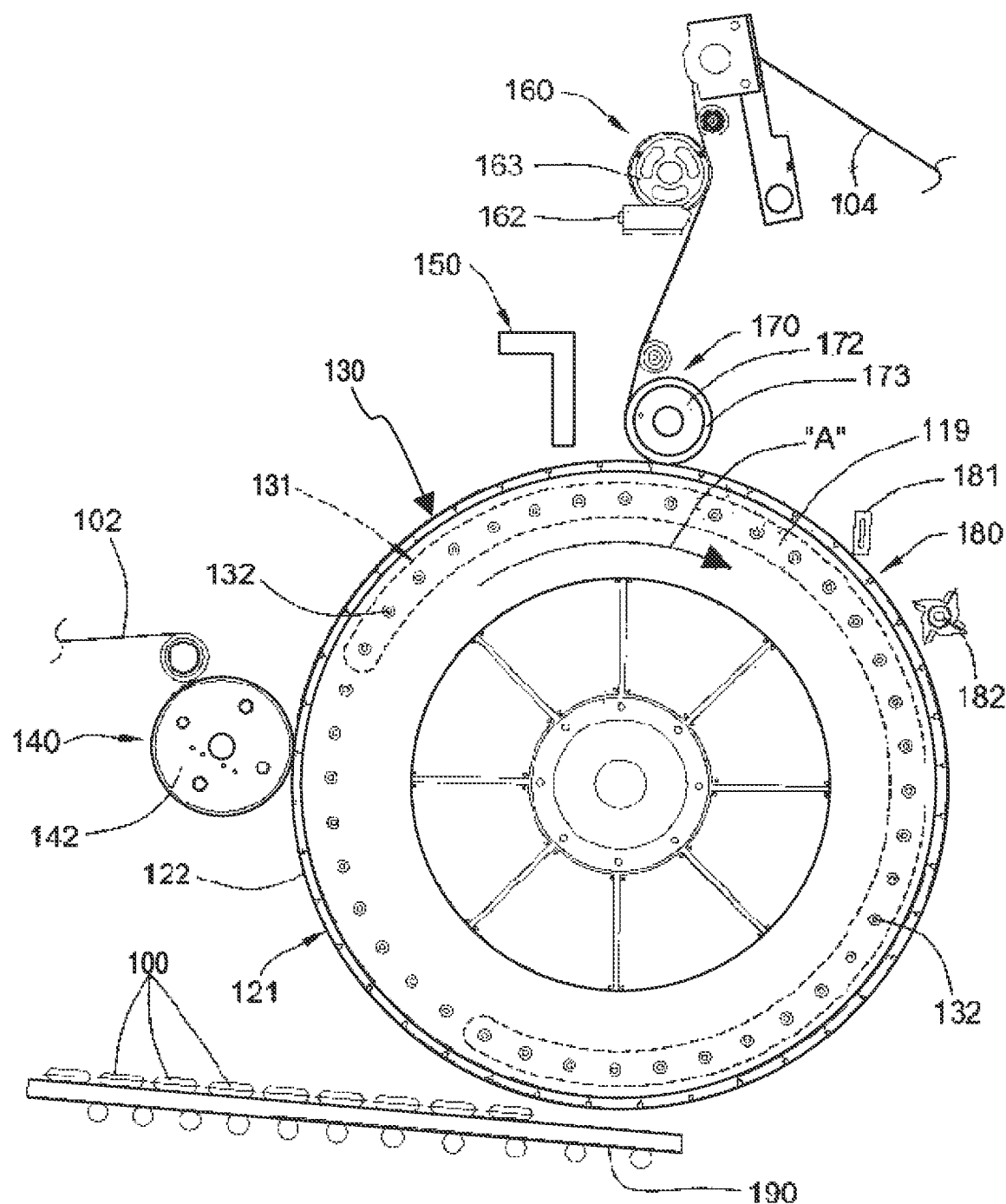
FIG. 5 is a schematic view of an exemplary rotary form, fill and seal machine for making pouches, as described herein.

FIG. 5 is a schematic representation of a rotary pouch forming apparatus or system suitable for forming a plurality of the pouches 100 depicted in FIGS. 1-3, pouches 200 depicted in FIGS. 8-10, or pouches depicted in FIG. 14, 15 or 16-18, all as discussed further below. The pouch forming apparatus is generally similar to that disclosed in aforementioned U.S. Pat. No. 3,218,776. Pouches 100 could, however, also be produced on a moveable platen, or other suitable machine.

A base forming drum 119 includes multiple rows of mold configurations 120 to produce multiple pouches simultaneously. Typically, the rotary drum 119 is formed of a plurality of long bars 121 supported on a wheel and defining an outer smooth film support surface 122. Each bar 121 includes multiple mold configurations 120, one of which is seen in FIG. 4, extending inward of the drum from smooth film support surface 122 along a perimeter edge 126. "Mold configuration" referred to herein, is a configuration of surfaces forming a void or cavity to receive the vacuum formed base stock film.

In this disclosure, for ease of description, the term "inward" means from the drum smooth film support surface 122 toward a bottom surface of the cavity of a mold configuration. "Outward" means in the opposite direction. "Laterally" means along the smooth film support surface 122, away from the perimeter edge of a mold configuration in that surface. Also, in reference to the film or web, "longitudinally" means along the length of the web material. "Transversely" means across the web or film from edge-to-edge.

The pouch forming apparatus additionally includes a vacuum system 130, a heater system 140, a product feed mechanism 150, a wetting system 160, a sealing system 170, a cutting system 180, and rolls of material that supply base film 102, and lid film 104.

Vacuum system indicated generally at 131 in FIG. 5, includes conduits 132, operatively connected to each mold configuration 120 to create a vacuum to draw a portion of the base film 102 into the mold cavities to form pockets 108, seen in FIG. 3, in base film 102. Such a vacuum system is well known in the art. A drive system (not shown) is operatively connected to the base forming drum 119 to rotate the drum continuously in direction "A."

The heater system 140 is depicted as a rotatable base film heater roller 142 positioned adjacent the base forming drum 119. It includes an internal element to heat the base film 102 prior to it contacting the smooth film support surface 122 of base forming drum 119 or being drawn into mold configurations 120 to form pockets 108. The heater system 140 may be configured as a cartridge-type heater within the base film heater roller 142 but other types of heaters, either internal or external to a roller, may be used if desired. In a typical method of thermoforming, for example, PVA or similar film, on a rotary drum form fill and seal pouch machine, the film is heated to a range of 140° F. to 400° F. depending on film thickness, type of film and other well-known operational parameters.

A product feed mechanism 150 is positioned generally adjacent the base forming drum 119 to supply one or more product components into each pocket 108 as the pockets, together with base film 102, move along with the outer smooth film support surface 122. Product feed mechanisms 150 are well known in the art and may take any known form. Such mechanisms may be configured to feed any desired type of composition, number or combination of individual products and/or materials including a liquid, a gel, a solid, a powder, a paste or wax-type products, pills, tablets, or even other pouched products.

A supply roll of continuous film material provides the lid film 104. The lid film 104 is aligned with the base film 102 so as to come into overlying contact with the base film 102 after the filling of the pockets 108 in the base film. The illustrated lid wetting system 160 helps create a strong seal between the base film and lid film. It is positioned adjacent the lid film 104 at a position upstream of where the lid film 104 seals the base film 102 at the base forming drum 119. The lid wetting system 160 may apply a solvent to the lid film 104 to increase its tackiness to assist in adhering the lid film 104 to the base film 102. To do so, the solvent may be provided through a wetting reservoir 162 to a wetting roller 163 that engages the lid film 104. In instances where the base film 102 and lid film 104 are formed of a polyvinyl alcohol material, the solvent for the lid wetting system 160 may be water.

A sealing system 170 having a sealing roller 172 is positioned in close contacting relation to the smooth film support surface 122 of base forming drum 119. Lid film 104 passes around sealing roller 172 and is urged into sealing contact with base film 102 to urge the contacting surfaces of base film 102 and lid film 104 into adhering, sealed relation. In this regard, the sealing roller 172 is mounted such that it applies pressure to the overlying films to perfect the sealing relationship. Sealing roller 172 may include an outer layer 173 formed of material that is deformable, such as a rubber or similar material, though this is not essential. Typically, this material has a thickness of about one-half inch (½") and a durometer of about 60, though these values may vary. The material, and the pressure exerted on the overlying films, assures affective contact of base film 102 and lid film 104 along the sealed interface 106. Of course, depending on the film material, it is also known to use heat, for example, ultrasonic welding or other similar process to seal the lid film and base film together to form a completed pouch.

A cutting system 180 may be positioned after, or downstream from the location at which the base film 102 and the lid film 104 are secured together. Cutting system 180 includes a series of transversely spaced apart slitting knives 181 that engage the combined films 102 and 104 to slit the films in a longitudinal direction along the outer surface of base forming drum 119 to create a plurality of longitudinal strips that each include a plurality of pouches 100. A rotary knife 182 may be positioned after, or downstream from the slitting knife 180.

Referring to FIG. 5, in operation, a base film 102 such as a polyvinyl alcohol film is fed from its supply roll and passes around rotatable base heater roller 142 and is heated to a temperature sufficient to allow thermoforming. In one example, the temperature may be approximately 160° F. but other temperatures may be utilized depending upon the material of the base film 102, its thickness, and other manufacturing characteristics.

The heated base film 102 is routed over the smooth film support surface 122 of long bars 121 of base forming drum 119. A vacuum applied to each mold configuration 120 deforms or stretches the base film 102 and pulls a portion of the heated film 102 into the mold cavity of each mold configuration to form base pockets 108 of the pouches 100. Pockets 108 define a fill volume to receive the product component. As the base forming drum 119 is rotated and the base film advanced, the product feed mechanism 150 operates to fill each base pocket 108 to a desired level with one or more product components such as a liquid, a gel, or powdered detergent or other material. Traditionally, the size of the fill volume defined by the base pocket exceeds the volume of the delivered product component by about ten (10) percent.

As the pockets 108 in the base film 102 are being formed and filled, the lid film 104 is fed from its supply roll and passes around lid film sealing roller 172. The lid film 104 is wetted by the lid wetting system 160. In doing so, water or another solvent may be applied to the lid film 104 and the film becomes sufficiently tacky to ensure securing the lid film 104 to the base film 102 along the overlying portions of the film to form sealed interface 106.

The film sealing roller 172 applies pressure and forces the base film 102 and the lid film 104 into contact with sufficient pressure to cause the two films to bond together at the seal interface 106 and seal the pockets 110 and form the pouches 100. The lid film 104, positioned in overlying relation to the base film 102 containing base pockets 108 filled with a desired composition or product. The lid film 104 is forcibly engaged with the base film 102 by sealing roller 172 acting against smooth surface 122 surrounding each mold configuration 120 to seal the films together along perimeter seal seam 111 and form completed containment pouches 100. The films adhere to each other in areas where they are in contact at seal interface 106. Consequently, the perimeter seal seam 111 of the sealed pouch replicates the shape of the perimeter edge 126 of mold configuration 120.

The combined base film 102 and lid film 104 continues to advance around the base forming drum 119 until reaching the cutting system 180. Slitting knives 181 and rotary knife 182 cut the combined films into the individual pouches 100, having a surrounding rectangular flange 118. The individual pouches 100 are discharged onto conveyor 190 for further processing.

FIG. 3 illustrates the shape of pouch 100 of FIGS. 1 and 2 after filling with product and sealing of base pocket 108 with lid film 104, but before it is removed from the mold cavity 120. As is well known, after release of the completed pouch from the mold cavity, internal pressure and the memory of the formed film causes it to try to return to its unstretched state and the pouch assumes the bulbous or "blister" shape seen in FIG. 2.

FIG. 4 illustrates a single mold configuration 120 that defines a mold cavity to form pocket 108 of base film 102. The mold configuration illustrated in FIG. 4 is approximately 1⅞ inches long (transversely), 1⅜ inches wide (longitudinally) and ⅝ inches deep. As explained, multiples of such mold configurations 120 are formed into the smooth film support surface 122 defined by long bars 121 of base forming drum 119. In this way multiple pouches are formed simultaneously. Mold configuration 120 is generally rectangular to produce the pouch 100 of FIGS. 1-3. Of course, the shape is merely illustrative. Numerous other pouch shapes are known, and produced.

The mold configuration 120 defines a void or cavity extending inward from a perimeter edge 126 at smooth film support surface 122 of the base forming drum 119. The maximum depth of the cavity is defined by a bottom wall surface 128. Bottom wall surface 128 includes a number of vacuum ports 133 in communication with conduits 132 to create the vacuum or negative pressure within the mold configuration 120.

The illustrated mold configuration 120 includes four straight side wall surfaces 124 joined by curved transition wall surfaces 125 extending to bottom wall surface 128 from perimeter edge 126. The side wall surfaces 124 and transition wall surfaces 125 extend inward of perimeter edge 126 perpendicular to, or at a slight relief angle to, smooth film support surface 122.

The perimeter edge 126 is comprised of side edge portions 126S and transition edge portion 126T. The perimeter edge side edge portions 126S represent the intersection of side wall surfaces 124 with smooth film support surface 122 and, in this conventional mold configuration, the perimeter edge transition edge portions 126T represent the intersection of transition wall surfaces 125 with smooth film support surface 122. The transition wall surfaces 125 are typically formed on a relatively large radius, about ⅜ inch or more. The side wall surfaces 124 and transition wall surfaces 125 join bottom wall surface 128 at a radius fillet 129, generally about ⅜ inch, to define a fill volume for base pocket 108 sufficient to receive product component 110.

Referring to FIG. 1, perimeter seal seam 111 of pouch 100 includes side seal seam portions 112 and corner seal seam portions 114 having a radius defined by the shape of transition edge portion 126T. The pouch shape thus replicates the relatively large radii of transition wall surfaces 125 of mold configuration 120 at transition edge portions 126T.

Figure 11:
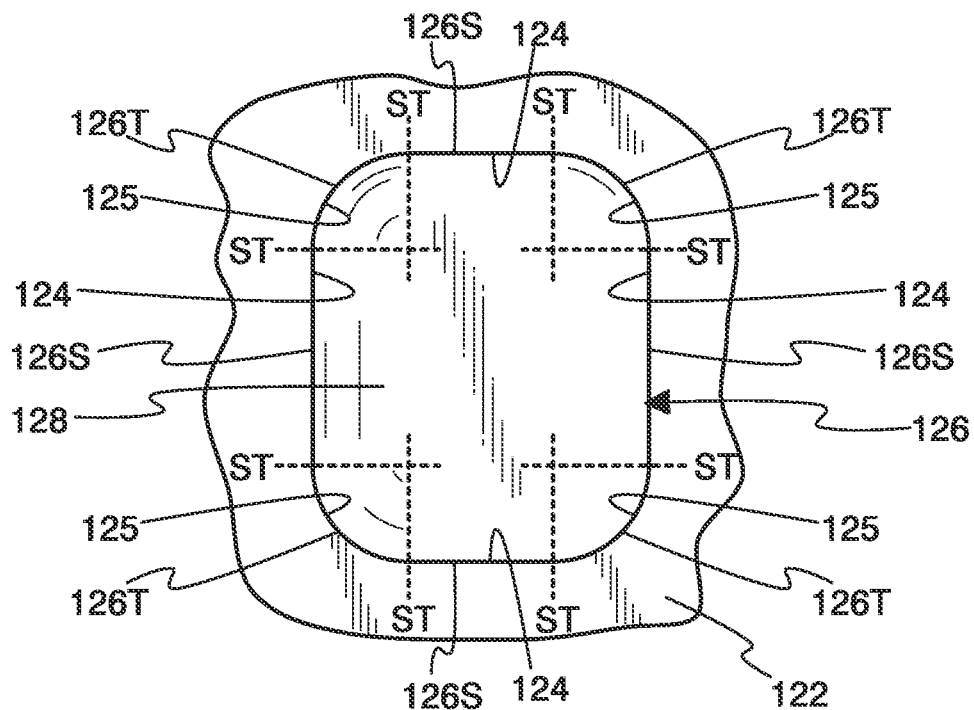
FIG. 11 is a top plan, schematic, view of the mold configuration of FIG. 4.

In FIG. 11, the imaginary lines "ST" indicate the demarcation between side wall surfaces 124 and transition wall surfaces 125 and, coincidentally, side edge portions 126S and transition edge portions 126T of perimeter edge 126. At lines ST, transition wall surfaces 125 tangentially merge with side wall surfaces 124. It is, of course, understood that this marking is for ease of understanding and that perimeter edge 126 is continuous and represents the perimeter definition of mold configuration 120 at smooth film support surface 122.

The films 102 and 104 form a sealed interface 106 that extends laterally from perimeter seam 111 of each completed pouch 100. That is, no adherence between films occurs over the void area where film 104 overlies base film 102 over pocket 108 represented by the cavity of mold configuration 120 within perimeter edge 126.

Pouches formed of polymeric material such as polyvinyl alcohol are prone to shrinkage and distortion after forming, filling and sealing. When located in mold cavity 120, the applied vacuum through ports 133 retains the shape illustrated in FIG. 3. Once released, however, the pouch base pocket 108 shrinks to a smaller volume, sometimes up to twenty or more percent (20%) smaller. Because the pouch 100 is sealed, the shrinkage is accommodated with stretching of lid film 104 to form the shape shown in FIG. 2. Often lid film 104 is a thinner material than base film 102 to augment the expansion characteristic of lid film.

In the thermoforming process, the film 102 is drawn into the mold cavity of the mold configuration. The film in the center of the pouch form is drawn down into contact with the bottom wall surface 128 of the mold configuration 120. When the film contacts bottom surface 128, heat dissipates and the film essentially ceases to stretch further. After the first contact of the film to the bottom wall surface 128 of the mold cavity, the film continues to be drawn into contact with the other surfaces of the mold configuration. Only the film that has not yet contacted the bottom surface of the mold configuration 120 continues to stretch spreading out over the bottom surface 128 until it is in contact with the entire cavity defining surfaces, including side wall surfaces 124 and transition wall surfaces 125. The film that contacts the mold configuration last is the film that has been stretched the most and is the thinnest film. It is the film at the radius fillet 129 overlying the junction of the bottom wall surface 128 of the mold cavity with the four side wall surfaces 124 and the four transition wall surfaces 125 as illustrated in FIG. 4.

The shape of the mold configuration 120, particularly the transition edge portions 126T of perimeter edge 126 and the relatively large radius of transition wall surfaces 125, is intended to provide for uniform deformation or stretch of the base film 102 during vacuum forming. Optimally, film stretch is maintained within the established guidelines of no greater than two times the pre-stretched area of film overlying the mold configuration cavity. Excessive stretching or thinning of the deformed film that causes weak areas in the formed pouch, which could result in failure and/or leakage is avoided.

All of the above-described machinery and processing steps are well known in the art. The purpose here was to explain the limitations inherent in manufacturing that have heretofore dictated the shape of the formed pouches. It has, and continues to be necessary, to avoid undue stretching or thinning of the polymeric films as it is processed. Mold configurations, such as mold configuration 120 of FIG. 4, require relatively large radii along perimeter edge 126 to form the transition between film support surface 122 and the mold cavity defined by side wall surfaces 124 and transition wall surfaces 125 to control film deformation or stretch during forming.

The remainder of this description is directed to the concepts of this disclosure, which overcome the above-described limitations as well as obviating the need for long tapering transitions with low volume capacity. In accordance with this disclosure, pouches can be formed with sharp definition, i.e., sharp corner profiles, without sacrifice of strength of the film, or integrity of the formed pouches. Moreover, it is contemplated that the approach of this disclosure greatly simplifies the design and manufacture of mold configurations to create sharply defined shapes for polymeric pouches formed by vacuum forming.

Application of the principles of this disclosure provides the capability to form flexible, sealed pouches of consumable product configured to present a sharp corner profile. The term "sharp corner profile" is used here with reference to the shape of the mold configuration perimeter edge, and the shape of the resultant pouch seal seam. A sharp corner profile is defined by lines or surfaces, generally straight or slightly curved, that meet at an intersection or vertex to form an angle. The principles disclosed herein are considered beneficial to corner profiles having a radius as large as about 7 mm (0.28"). In employing such principles, corner profiles having a radius as small as about 1 mm (0.004") can be achieved. Accordingly, the term sharp corner profile is intended to embrace this entire spectrum. As will be described below, there may be more than four sharp corner profiles defined by a mold configuration perimeter edge or the seal seam of a resultant pouch.

Figure 8:
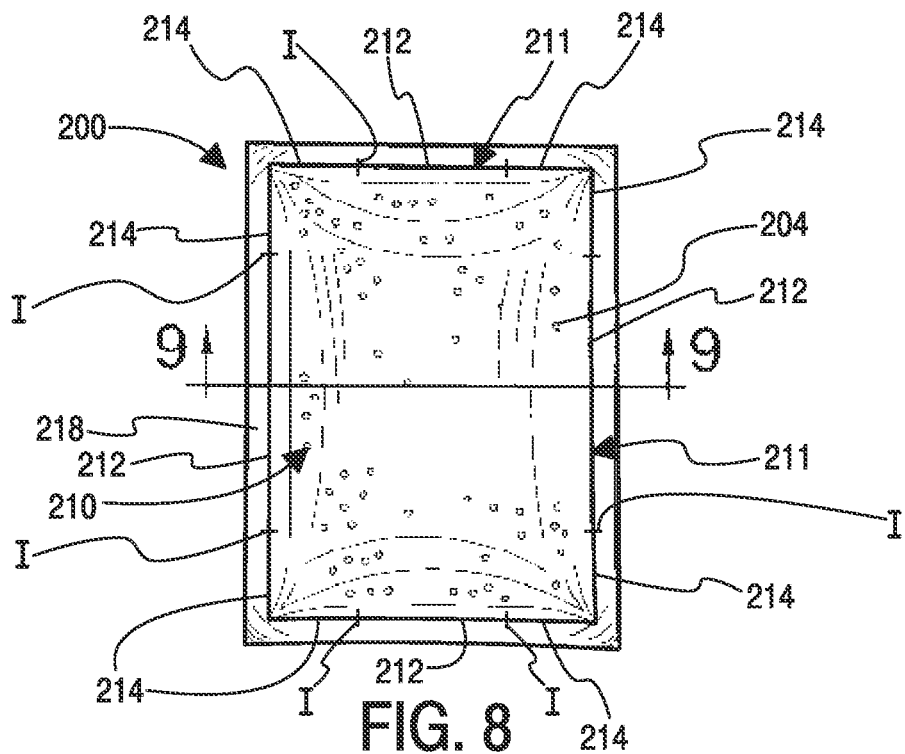
FIG. 8 is a top view of a flexible containment pouch made with the mold configuration of FIGS. 6 and 7 in accordance with the disclosure.
Figure 9:
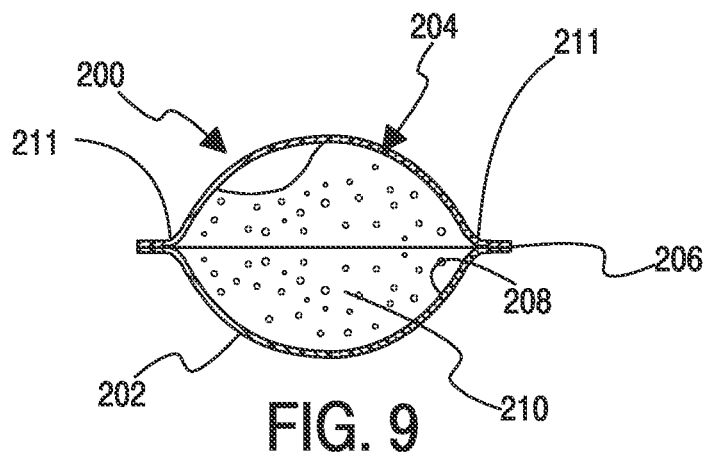
FIG. 9 is a sectional view of the pouch of FIG. 8 taken along the line 9-9 of FIG. 8.
Figure 10:
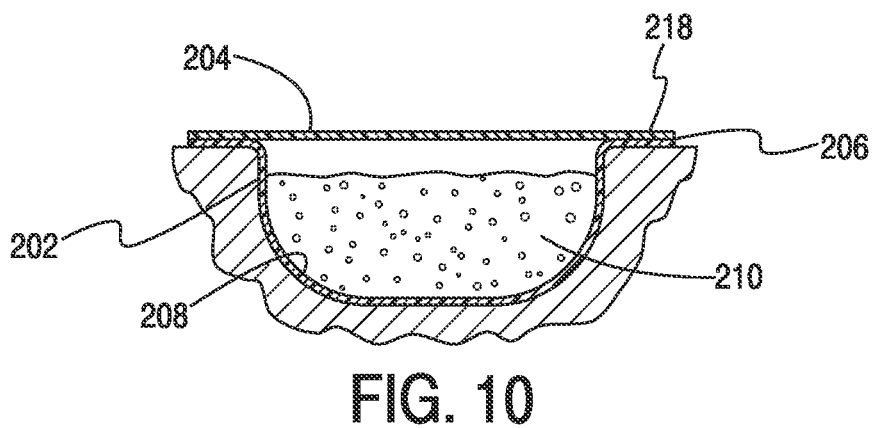
FIG. 10 is a sectional view of the pouch of FIG. 8 at an interim stage of the process.

An exemplary flexible product containing pouch with sharp corner profiles, designated 200, is illustrated in FIGS. 8-10. It is but one such pouch embodiment. The specific shape is not a limitation on application of these principles. Numerous and varied shapes and configurations of pouches may be created which embody the concepts disclosed.

Pouch 200 includes a base film 202 defining base pocket 208 and a lid film 204 joined along a seal interface 206, forming surrounding flange 218. It includes a hollow interior volume defined by perimeter seal seam 211 containing a product component 210, in this illustration, a liquid. Of course, any other desired product component is suitable to the pouch produced in accordance herewith.

The perimeter seal seam 211 includes generally straight perimeter side seal seam portions 212 joined by corner seal seam portions 214 that, in accordance with this disclosure, define a sharp corner profile.

Figure 6:
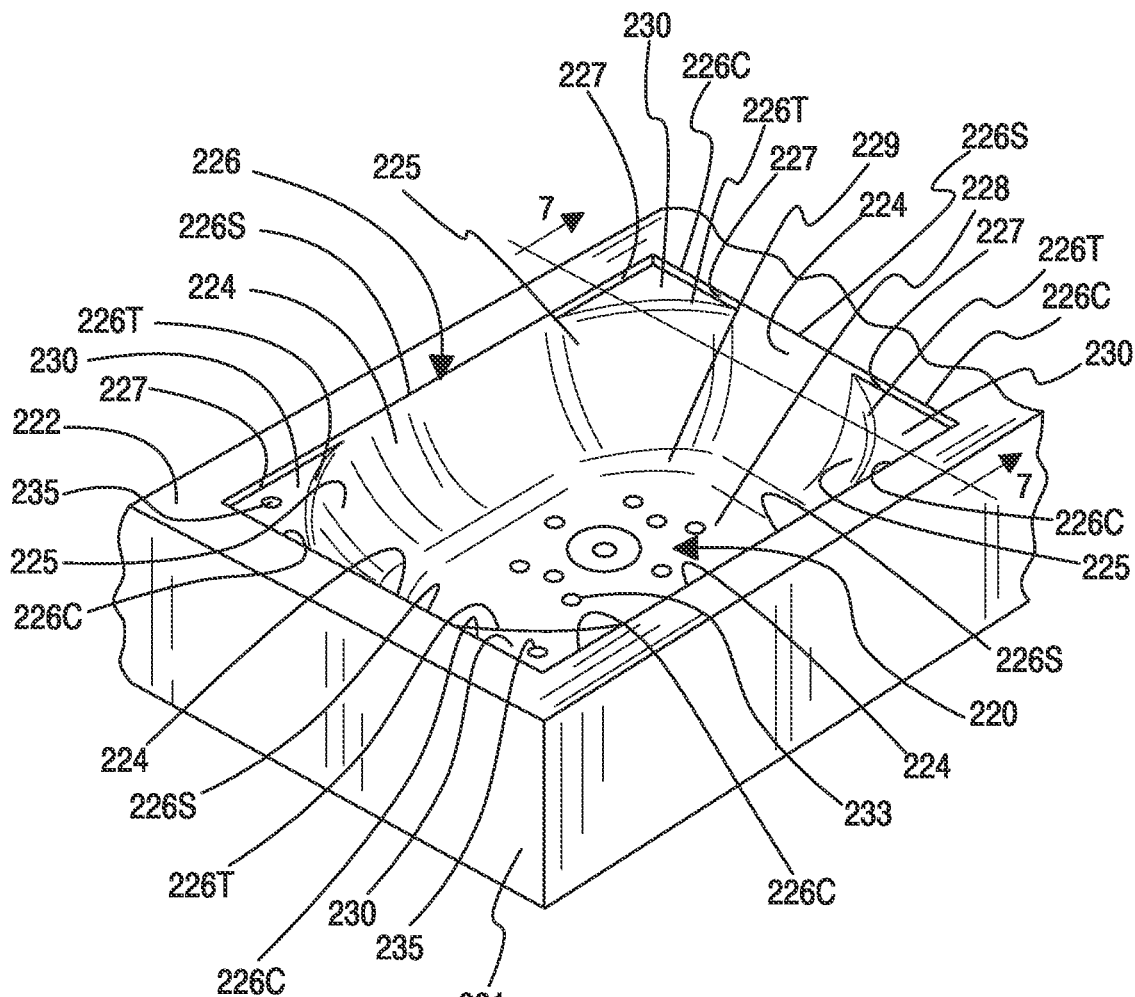
FIG. 6 is a perspective view of a mold configuration in accordance with the present disclosure.
Figure 7:
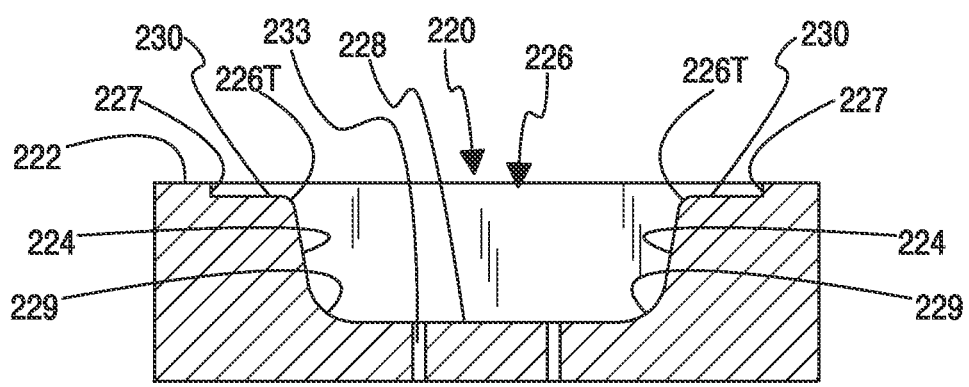
FIG. 7 is a sectional view of the mold configuration of FIG. 6 taken on line 7-7 of FIG. 6.

FIGS. 6 and 7 illustrate a mold configuration 220 for producing the pouch 200 of FIGS. 8-10. Mold configuration 220 defines a mold cavity extending inward from smooth film support surface 222 of a long bar 221, multiples of which form a base forming drum similar to the drum 119 of FIG. 5.

The mold cavity of mold configuration 220 extends inward of smooth film support surface 222 from perimeter edge 226. It includes four side wall surfaces 224 joined by four transition wall surfaces 225 that extend to a bottom wall surface 228 at a generous radius fillet 229, about ⅜ inches. The bottom wall surface 228 includes a number of vacuum ports 233 in communication with conduits within the rotary drum to create a vacuum or negative pressure within the mold configuration 220. In general, these features of the mold configuration parallel the mold configuration 120 of known design, seen in FIG. 4.

In accordance with this disclosure and as seen in FIG. 6, the perimeter edge 226 of the mold configuration differs significantly from perimeter edge 126 of the conventional mold configuration 120 illustrated in FIG. 4. Here, perimeter edge 226 includes side edge portions 226S joined by sharp corner edge portions 226C.

Sharp corner edge portions 226C are defined by the intersection of inward edge surfaces 227 with smooth film support surface 222. Inward edge surfaces 227 are disposed in a sharp corner profile and extend inward from perimeter edge 226 of the mold cavity perpendicular, or at a slight relief angle, to smooth film support surface 222 to plateau surfaces 230. In this regard, inward edge surfaces 227, at perimeter edge 226 of mold configuration 222 define lines (sharp corner edge portions 226C) that are generally straight and meet at an intersection or vertex to form an angle within the sharp corner profile definition previously set forth.

It should be understood that the inward edge surfaces 227 need not be perpendicular to smooth film support surface 222. It is only necessary that the inward depressions to plateau surfaces 230 be such that during deformation of the base film, no excessive or uneven stretching or thinning occur.

In particular reference to FIGS. 6 and 7, the plateau surfaces 230 present relieved areas in each corner of the mold configuration 220, adjacent sharp corner perimeter edge portions 226C, but spaced inwardly from the smooth film support surface 222. The inward spacing of the plateau surfaces 230 relative to the smooth film support surface 222 of the drum, represents the inward length of inward edge surfaces 227. The inward spacing of the plateau surfaces 230 relative to the smooth film support surface 222 forming relieved areas is limited to permit the base film at those areas to be deformed or stretched only a relatively small amount below or inward from the smooth film support surface 222 during vacuum forming of the base film into the cavity of the mold configuration 220. This minimal stretching or deformation ensures the integrity of the base film 202, even though that stretching or deformation occurs in a sharp corner profile represented by sharp corner edge portions 226C. Importantly, the inward length of inward edge surfaces 227 should also be adequate to ensure that the lid film 204 and base film 202 do not adhere together in the areas overlying the plateau surfaces 230. It, for example, may be approximately 2 mm (0.08"). In general, the plateau surfaces 230 at the four corners of the mold configuration 220 may be from 1 to 6 mm (0.04 to 0.24") inward or below the smooth surface film support surface 222.

The plateau surfaces 230 need not be planar or parallel to the smooth film support surface 222 of the drum or to each other. They could be formed, for example, at an angle extending inwardly from the inward edge surfaces 227. It is only necessary that the plateau surfaces 230 be spaced inward of the smooth film support surface 222 so as to ensure minimal deformation or stretching of base film in these locations during vacuum forming and also provide sufficient spacing between base film 202 and lid film 204 during pouch closure such that the lid film 204 does not adhere to the base film 202 at these locations.

As best seen in FIG. 6, mold configuration 220 includes, as in the instance of mold configuration 120 of FIG. 4, curved transition wall surfaces 225 that join generally straight side wall surfaces 224. However, in this embodiment, transition wall surfaces 225 define transition edge portions 226T at the juncture of transition wall surfaces 225 with plateau surfaces 230.

The mold configuration 220 side wall surfaces 224 and transition wall surfaces 225, along with bottom wall surface 228 and radius fillet 229, define a fill volume for base pocket 208 to receive the product component. Hence, this fill volume is inward of plateau surfaces 230, though that is not essential. As in the conventional mold configuration 120 of FIG. 4, the fill volume may exceed the volume of the product component 210 by about ten percent (10%). Notably, the configuration of the side wall surfaces 224, transition wall surfaces 225 bottom wall surface 228 and radius fillet 229 represent a mold cavity configuration designed to ensure proper film stretch or deformation in accordance with conventional forming principles.

Figure 12:
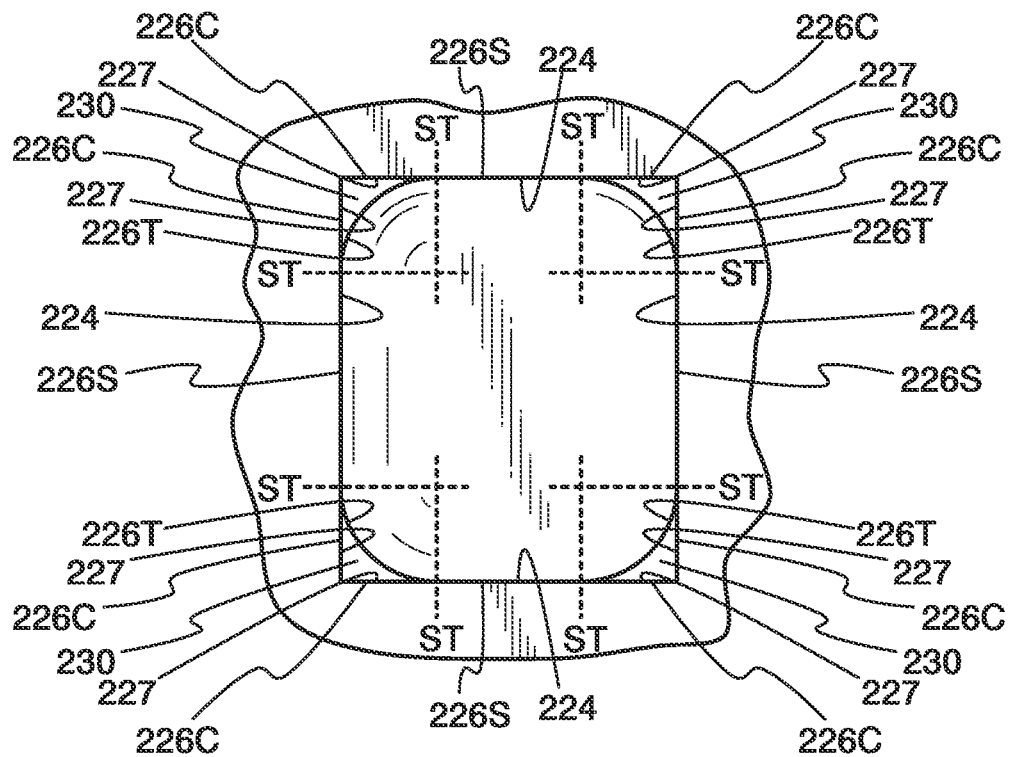
FIG. 12 is a top plan, schematic, view of the mold configuration in accordance with the disclosure illustrated in FIGS. 6 and 7.

In FIG. 12, the imaginary lines "ST" indicate the demarcation between side edge portions 226S and sharp corner edge portions 226C of perimeter edge 226 of mold configuration 220, seen in FIG. 6. Also, at lines ST, curved transition wall surfaces 225 tangentially merge with side wall portions 224. Notably, each inward edge surface 227 extends along perimeter edge 226 from the corner intersection (vertex) with its associated inward edge surface 227 to the transition between associated side wall surfaces 224 and transition wall surfaces 225. As seen in FIG. 12, inward edge surfaces 227 merge or seamlessly blend into side wall surfaces 224 at imaginary lines ST.

Perimeter edge 226 is continuous and represents the perimeter definition of mold configuration 220, in accordance with this disclosure. As in the known mold configuration of FIG. 4, the perimeter edge 226 of the mold configuration 220 of FIGS. 6 and 7, defines the shape of the formed pouch. As in the known pouch of FIGS. 1-3, the perimeter edge 226 of the mold configuration 220 of FIG. 4 defines the perimeter seal seam 211 between the base film 202 and lid film 204 on formation of a completed pouch 200. Since the perimeter edge 226 sharp corner edge portions 226T present a sharp corner profile, the resultant pouch 200 presents that same shape, as illustrated in FIG. 8.

In accordance with the disclosure, the pouch forming mold configuration 220 in the base film smooth support surface 222 has a generally rectangular perimeter edge 226. That is, as seen in FIG. 6, all corners of the mold configuration 220 are formed with sharp corner profiles. These corner profiles are defined by the intersection of the inward edge surfaces 227 defining the mold cavity and the smooth film support surface 222 of the drum surrounding the mold cavity. Here, straight lines defined by inward edge surfaces 227 intersect at a vertex and define corners having an angle of 90° (degrees). This angle is not, however, essential. The lines defining the sharp corner profile may intersect at angles greater, or smaller, than 90°, as illustrated in further embodiments described below and shown in FIGS. 15-18.

Manufacture of pouches such as illustrated in FIGS. 8-10, proceeds as in the manufacture of pouches illustrated in FIGS. 1-3. However, the rotary drum or platen of the form, fill and seal machine is provided with mold configurations 220 as illustrated in FIGS. 6 and 7. When the base film is drawn into the mold cavity of a mold configuration 220 and forms base pocket 208 illustrated in FIG. 10, the base film overlying the relieved areas at plateau surfaces 230 is drawn inward and below the smooth film support 222 surface of the drum only to a level of plateau surfaces 230. This depth is shallow enough to prevent any excessive stretching or thinning of the film in this area. While not considered essential to the process, the plateau surfaces 230 may also have vacuum ports 235 to ensure contact of base film with these surfaces. This option is illustrated in FIG. 6.

The balance of the base pocket 208 is drawn into the mold cavity defined by side wall surfaces 224, transition wall surfaces 225, radius fillet 229 and bottom wall surface 228 in accordance with known methods. The base film remains at an adequate thickness to form a functional base pocket 208 defining a fill volume that is adequately sized, durable and does not leak from over-stretching of the film.

On filling, the formed base film pocket shape receives about 90% of its capacity. As depicted in FIG. 10, the consumable product material may reside only in the fill volume of the pocket defined by side wall surfaces 224, transition wall surfaces 225, the bottom wall surface 228 and radius fillet 229, but not the plateau surfaces 230, though this is not essential. That is, some amount of the product component 210 may initially be disposed on film 202 at plateau surfaces 230. Importantly, the film in the relieved areas overlying plateau surfaces 230 is below the smooth film support surface 222 of the drum. On completion of a pouch, the base film 202 and lid film 204 are not adhered together in the relieved areas.

When the pouch 200 is filled and sealed with an overlying lid film 204, the pouch 206 will take on the shape dictated by the cavity perimeter edge 226 at the surface 222 of the mold configuration 220. Pouch 200 will thus present sharp corner profiles defined by perimeter edge 226. In this regard, the seal seam 211 sharp corner seal seam portions 214 form right angles (90°). Imaginary indicator lines designated I, are shown in FIG. 8 to indicate the demarcation of sharp corner seal seam portions 214.

As previously explained with regard to the pouch 100 of FIGS. 1-3, on release from the mold configuration, the pouch conforms to the shape illustrated in FIG. 9 as a result of the well-known shrinkage of the base film and complementary stretch or expansion of the lid film. The films 202 and 204 used to produce pouches 200 may be similar in composition and thickness to those used to produce pouches 100.

The result of the above-described modification to the mold configuration 220 of FIGS. 6 and 7 as compared to the mold configuration 120 of FIG. 4, is evidenced by comparison of the pouch 100 of FIGS. 1-3 and the pouch 200 of FIGS. 8-10. Importantly, the perimeter seam seal 211 between the base film 202 and lid film 204 defines sharp corner profiles. This shape derives from the spacing or separation between the films where they overlie the plateau surfaces 230 during the compression pressured sealing of the films. The films do not contact each other sufficiently to adhere at the portions of the pouch films overlying the plateau surfaces 230. Consequently, the films form additional internal pouch volume, extending to the perimeter seal seam 211.

The embodiment of FIGS. 6-10 illustrates a mold configuration and pouch with four corners presenting sharp corner profiles. The embodiments of FIGS. 13,15 and 16-19 are illustrative of mold configurations and pouches with numerous sharp corner profiles, each with sharp definition.

FIG. 14 illustrates a star shaped pouch 500 formed using conventional mold configuration principles, that is, without sharp corner profiles formed in the perimeter edge of the mold configuration. The pouch consequently has a perimeter seal seam 511 with rounded corners 503 that replicate the perimeter edge of the mold configuration used to produce the pouch.

FIG. 13 illustrates a mold configuration 320, in accordance with the disclosure, for making a star-shaped pouch 300 having sharp corner profiles as seen in FIG. 15. Pouch 300 has a base film formed by vacuum forming into a base pocket to which is sealed a lid film 304 to form flange 318 of adhered films. The pouch configuration is defined by perimeter seal seam 311 and contains a product component 310. It includes multiple star point shaped facets 317 defined by sharp corner profiles.

Perimeter seal seam 311 includes corner seal seam portions 314A and 314B, respectively, defining acute and obtuse angles (as viewed from within pouch 300) all presenting sharp corner profiles. Indicator lines perpendicular to seal seam 311 (designated I) are present in FIG. 15 to show the demarcation between these elements of the seal seam. Each associated pair of corner seal seam portions 314A meet at an intersection or vertex defining an acute angle. These corner seal seam portions form the points of the star shaped pouch 300. Similarly, each associated pair of corner seal seam portions 314B meet at an intersection or vertex to form an obtuse angle at the base of each star point facet. The slightly convex seal seam portion 314A and slightly convex seal seam portion 314B tangentially merge into each other midway between the sharp corner profiles (at imaginary lines I) to define the complete perimeter seal seam 311. These slightly curved lines, some convex (314A), some concave (314B) when viewed from inside pouch 300 are intended to improve the aesthetic qualities of pouch 300.

The mold configuration illustrated in FIG. 13, defines a mold cavity extending inward from a smooth film support surface 322 of a rotary drum or movable platen. It includes transition wall surfaces 325, joined to a bottom surface 328 by a relatively generous radius fillet 329, illustrated as about ⅜ inch. These surfaces define a fill volume to receive the pouch product content. This structure of mold configuration 320 is consistent with conventional mold configuration practices to avoid undesirable stretching or thinning of the pouch film during forming.

Mold configuration 320 extends inwardly of smooth film support surface 322 from perimeter edge 326, which includes a plurality of sharp corner profiles defined by corner edge portions 326A and 326B. The demarcation between edge portions 326A and 326B is identified in FIG. 13 by imaginary lines designated I.

Sharp corner edge portions 326A and 326B are defined by the intersection of inward edge surfaces 327 with smooth film support surface 322. These edge portions extend inwardly perpendicular to smooth film support surface 322 to plateau surface 330. They define sharp corner edge portions 326A, which meet at an intersection or vertex to form an acute angle. They also define sharp corner edge portions 326B, which meet at an intersection or vertex to form an obtuse angle. Both these angles are within the sharp corner profile definition previously set forth.

As illustrated in connection with the mold configuration illustrated in FIGS. 6 and 7, sharp corner edge portions 326A and 326B are formed by inward edge surfaces 327. Inward edge portions 327 extend between perimeter edge 326 at smooth film support surface 322 and plateau surfaces 330, which are disposed inward of film support surface 322 only an amount sufficient to avoid adherence of the lid film 304 and base film on closure of the pouch.

The mold configuration 320 includes relieved areas at plateau surfaces 330 associated with each sharp corner profile to reduce film stretching and stress on the film during forming. Notably, in this embodiment, the plateau surface 330 at each sharp corner profile merges with the plateau surface of adjacent sharp corner profiles thereby forming a continuous plateau surface 330 coextensive with the perimeter edge 326.

The plateau surface 330 meets the smooth radius transition wall surfaces 325 of the mold configuration 320 at transition edge portions 326T (see FIG. 13). Plateau surface 330 is only spaced from the smooth film support surface 322 an amount sufficient to permit deformation of the base film inward of the mold cavity within the accepted guidelines of film deformation. Such spacing may usually be from about 1.0 mm (0.04") to about 6 mm (0.24") depending on film thickness, pouch size and other factors.

Moreover, on application of the lid film, which for PVA films normally has been wetted or otherwise made "sticky," the resultant spacing between films avoids contact in the relieved areas associated with the plateau surfaces 330. The perimeter edge 326 at the smooth film support surface 322 defines the perimeter seam of the two films creating a pouch with sharp corner profiles as illustrated in FIG. 15. This sharp corner profile pouch represents a striking enhancement over a star shaped pouch as illustrated in FIG. 14. There, because the rounded transition wall surfaces of the mold configuration extend to the perimeter edge, the star pouch perimeter seal seam 511 is also rounded.

It is also important to note that a mold configuration with sharp corner profiles but without plateau surfaces 330 disposed inward of the perimeter edges 326 to limit film stretch at those areas would result in excessive stretching or thinning of the base film in the sharp corners and lead to tears and/or leakage. This consequence is avoided by the principles of this disclosure.

It is contemplated that as disclosed herein, a wide variety of desired pouch shapes can be created employing relieved areas adjacent the perimeter edge of a mold configuration with sharp corner profiles. That is, the shape of the perimeter edge for a mold configuration may include sharp corner profiles, so long as there is also provided a plateau surface associated with the sharp corner profiles that; 1) limits deformation or stretch of the base film on application of vacuum to draw it into the mold cavity and 2) is sufficiently spaced from the smooth film support surface of the base forming drum to avoid adherence between the base film and lid film at these locations. Such relieved areas are accomplished by providing inward edge surfaces that extend to plateau surfaces within a cavity defined by a mold configuration, as described.

The plateau surfaces adjoin a central product fill volume or cavity defined by a bottom wall surface 328 with a radius fillet 329 to large radius transition wall surfaces 325, within which the base film is formed to conventional stretch guidelines. The fill volume or cavity has sufficient capacity to receive the desired quantity of product component to be packaged. The relieved areas at the plateaus provide spacing between the base film and lid film to ensure minimal stretch during forming and insufficient contact in those areas to prevent adherence between the films on sealing of the pouches being formed.

Figure 16:
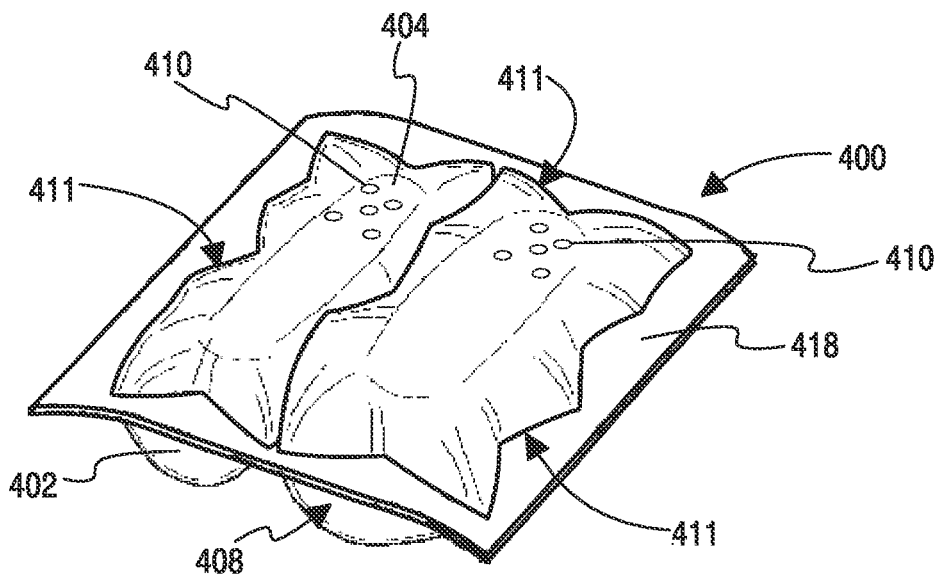
FIG. 16 is a perspective view of a multi-chamber flexible containment pouch made in accordance with the disclosure.
Figure 17:
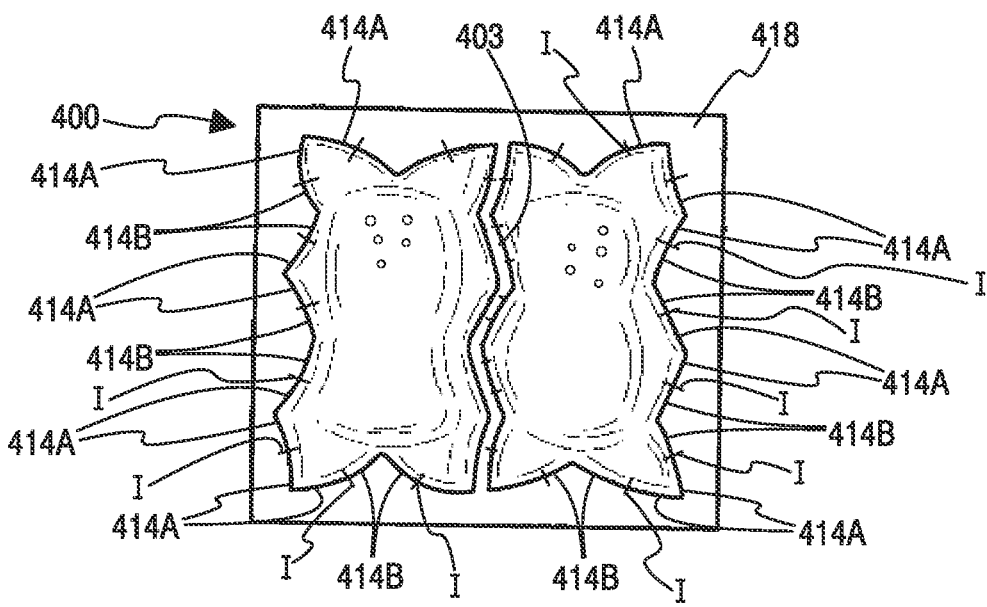
FIG. 17 is a top view of the multi-chamber pouch of FIG. 16 made in accordance with the disclosure.
Figure 18:
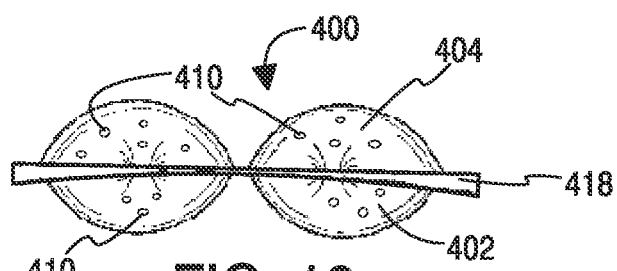
FIG. 18 is an end view of the multi-chamber pouch of FIGS. 16 and 17 made in accordance with the disclosure.
Figure 19:
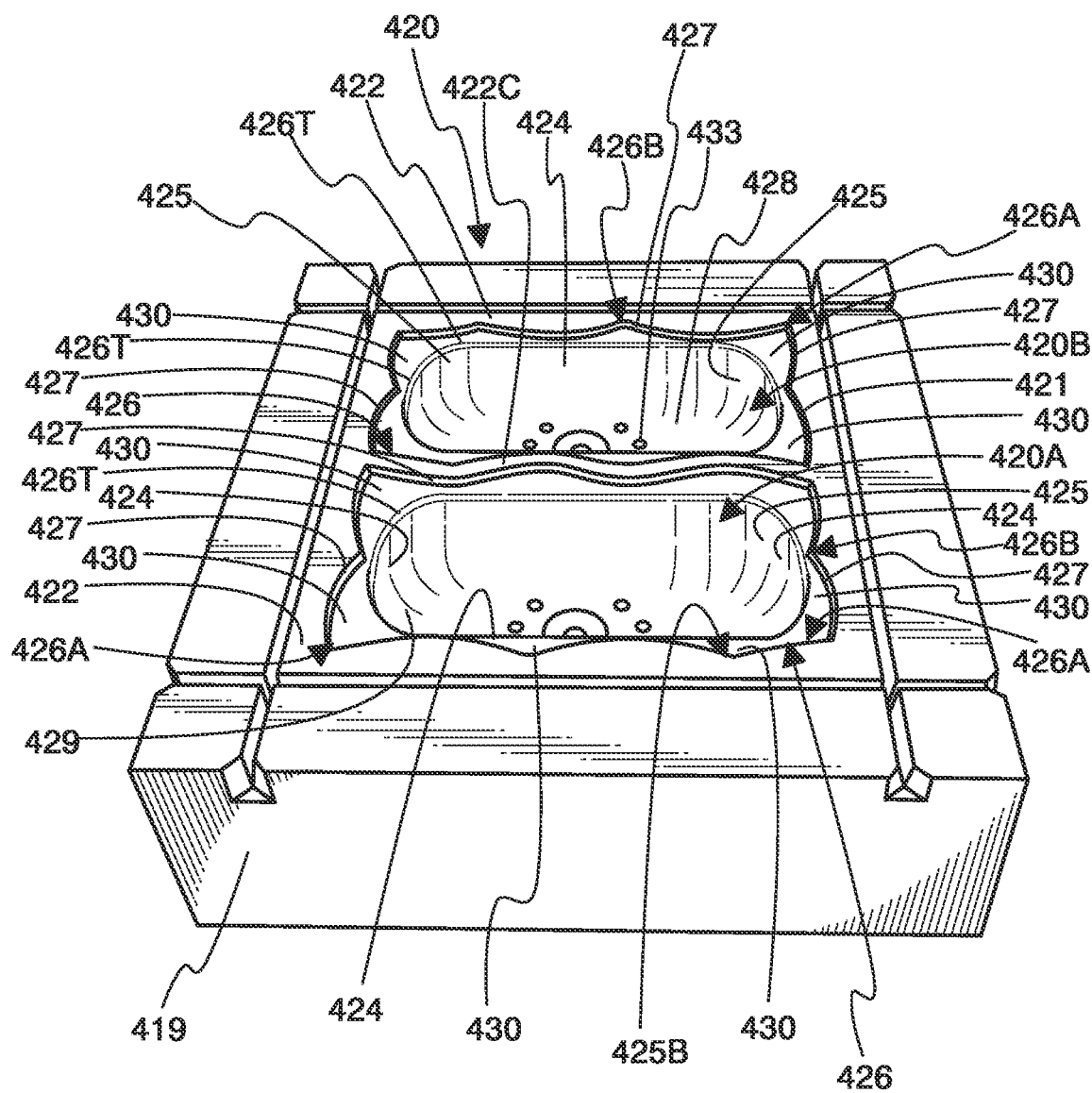
FIG. 19 is a perspective view of a mold configuration in accordance with the disclosure for making the flexible multi-chamber containment pouch of FIGS. 16-18.

A further example of the versatility of the principles disclosed herein is illustrated by the mold configuration and resultant pouch of FIGS. 16-19. In accordance with the disclosure, a multi-chamber pouch 400 having sharp corner profiles is shown in FIGS. 16-18. The mold configuration for creating pouch 400 is shown in FIG. 19.

Pouch 400 has a base film 402 formed by vacuum forming into a base pocket 408 to which is sealed a lid film 404 to form flange 418. It has multiple chambers, separated along a central web 403 best seen in FIG. 17. Base film 402 and lid film 404 are adhered together at central divider 403 as in flange 418. The pouch shape is defined by perimeter seal seam 411 about each chamber defining sharp corner profiles and contains a product component 410 within the formed pouch chambers.

Perimeter seal seam 411 includes corner seal seam portions 414A and 414B, formed of slightly curved lines, respectively, defining acute and obtuse angles (as viewed from within pouch 400) all presenting sharp corner profiles. Imaginary indicator lines (designated I) perpendicular to seal seam 411 are seen in FIG. 17, that show the demarcation between these elements of the seal seam. Of course, corner seal seam portions 414A and 414B could be formed by straight lines.

Corner seal seam portions 414A and 414B merge together at imaginary indicator lines I. In this embodiment, each associated pair of corner seal seam portions 414A or 414B meet at an intersection or vertex to form an angle. The combined corner portions 414A and 414B of seal seam 411 present the multiple chamber pouch configuration with multiple sharp corner profiles.

Mold configuration 420 of FIG. 19 is illustrative of plateau surfaces, designated 430, disposed inward of smooth film support surface 422, defining relieved areas employed in a multi-chamber mold configuration. Mold configuration 420 defines separate voids or cavities 420A and 420B extending from a perimeter edge 426 at smooth outer film support surface 422 of a long bar 419, as explained, a part of a base forming drum such as seen in FIG. 5. In this instance, the mold configuration includes a central divider 422C defined by smooth film support surface 422 of base forming drum long bar 419. This divider could be formed with straight line edges as has been the case in prior multi-chamber pouches, or it could be scalloped or some other desired shape.

Each separate chamber 420A and 420B of mold cavity of mold configuration 420 extends inward of smooth film support surface 422. It includes side wall surfaces 424 joined by transition wall surfaces 425 that extend to a bottom wall surface 428 at a generous radius fillet 429, about ⅜ inches. The bottom wall surface 428 includes a number of vacuum ports 433 in communication with conduits within the rotary drum to create a vacuum or negative pressure within the mold configuration 420. In general, these features of the mold configuration parallel the mold configuration 120 of known design, seen in FIG. 4.

As in the embodiment of the mold configuration 220 of FIGS. 6 and 7, and the mold configuration 320 of FIG. 11, the perimeter edge 426 of mold configuration 420 defines the perimeter seal seam 411 joining the base film 402 and lid film 404 to complete a multi-chamber pouch 400. Here, the multiple compartments of a single pouch 400 are created by adherence of the lid and base films along central divider 422C.

Chambers 420A and 420B of mold configuration 420 extend inwardly of smooth film support surface 422 from perimeter edge 426, which includes a plurality of sharp edge profiles defined by corner edge portions indicated generally as 426A and 426B in FIG. 19. Sharp corner edge portions 426A and 426B are defined by the intersection of inward edge surfaces 427 with smooth film support surface 422. These edge portions extend inwardly perpendicular to smooth film support surface 422 to plateau surface 430 and are slightly curved, though they could be straight.

Sharp corner edge portions 426A meet at an intersection or vertex defining an acute angle and sharp corner edge portions 426B meet at an intersection or vertex defining an obtuse angle, each within the sharp corner profile definition previously set forth. The sharp corner edge portions 426A and 426B merge to define continuous perimeter edge 426 around each separate cavity 420A and 420B.

Relieved areas within mold configuration 420 are defined by plateau surface 430 inward of the smooth film support surface 422. In this embodiment, plateau surface 430 is continuous about the perimeter edge 426. It is spaced inward of smooth film support surface 422 only a distance sufficient to permit minimal deformation or stretching of the base film 402 at these areas. It is also spaced inward sufficiently to avoid adherence of the base film 402 and lid film 404 on pouch formation.

The remainder of the mold configuration cavity is defined by side wall surfaces 424 and transition wall surfaces 425 joined to a bottom wall surface 428 by a generous radius fillet 429. These surfaces extend from transition edge portions 426T at the juncture with plateau surface 430. They define the fill cavity inward from plateau surface 430, though it is not essential that the fill volume be completely below the plateau surfaces.

Utilization of the plateau surface 430 adjacent, but spaced inwardly from smooth film support surface 422 at the perimeter edge 426 of the mold configuration 420 provides the capability to create complex perimeter seams and consequently complex pouch shapes without excessive stretch or thinning of the pouch forming base film overlying the plateau surface during forming. The plateau surface provides relieved areas with sufficient spacing between the facing surfaces of the base film 402 and lid film 404 to prevent adherence where the films overlie the relieved areas. Hence, the perimeter seal seam 411 follows the perimeter edge 426 of the mold configuration 420, as has been explained.

Understandably, as illustrated by the embodiment of FIGS. 16-19, the principles disclosed herein apply to creation of pouches having more than one product compartment. The important feature is the interposition of plateau surfaces 430 within the mold cavity adjacent the perimeter edge 426 of the mold configuration 420 to provide relieved areas adjacent the sharp corner profiles. The remainder of the mold configuration portions define the fill chamber in accordance with conventional mold design principles to receive the product component to be packaged.

The inwardly spaced plateau surfaces 430 ensure minimal deformation of the film during base pocket formation and prevents undue stretching or weakening of the film. The plateau surface 430 is also significant in the pouch forming process in that they represent relieved areas where the base film and overlying lid film will not adhere together during pouch completion. The pouch internal volume is thus defined by the perimeter edge of the mold configuration 426 at the smooth outer film support surface 422, with the separated films overlying the plateau surfaces adding or contributing to the overall internal pouch volume.

The foregoing embodiment is another example of the versatility of the mechanisms and methods disclosed herein. The principles disclosed provide for manufacture of new and aesthetically pleasing pouch shapes without sacrifice in pouch strength. Moreover, it is contemplated that this capability will lead to pouch shapes not previously possible.

It is contemplated that the principles disclosed here are not limited to forming pouches with sharp corner profiles. Relieved areas in the mold configuration adjacent the perimeter edge, defined by inwardly disposed plateau surfaces can be employed to form any shape pouch perimeter. The perimeter edge of the mold configuration defines the perimeter seam between joined films and consequently the pouch shape. Inwardly disposed plateau surfaces forming relieved areas adjacent these perimeter edges, surrounding, or partially surrounding, a central fill cavity of the mold configuration may be employed to minimize film deformation, stretch or weakening in any pouch configuration by limiting film stretch, while also permitting film spacing sufficient to avoid adherence between the films in these areas during closure or completion of the formed pouch.

It will be appreciated that the foregoing description provides examples of the disclosed system and techniques. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A mold configuration for forming a pocket in a base film of a pressurized product containment pouch having a base film and a lid film adhered about a perimeter seal seam comprising:
   a film support surface;
   perimeter edge at said film support surface;
   wall surfaces extending inward from said perimeter edge defining a mold cavity;

said wall surfaces including a bottom wall surface and transition wall surfaces extending to said bottom wall surface; and at least one plateau surface within said mold cavity, inward of said perimeter edge.

2. A mold configuration for forming a pocket in a base film as claimed in claim 1, wherein said perimeter edge includes sharp corner profile perimeter edge portions defining at least one sharp corner profile; and said wall surfaces include inward edge surfaces that extend between said sharp corner profile perimeter edge portions and said at least one plateau surface of said at least one sharp corner profile.

3. A mold configuration for forming a pocket in a base film as claimed in claim 2, wherein one of said transition wall surfaces extends between said bottom wall surface and said plateau surface of said at least one sharp corner profile.

4. A mold configuration for forming a pocket in a base film as claimed in claim 3, wherein said sharp corner profile perimeter edge portions defining said at least one sharp corner profile are straight or slightly curved, and meet at an intersection or vertex.

5. A mold configuration for forming a pocket in a base film as claimed in claim 3, wherein said perimeter edge includes plural sharp corner profile perimeter edge portions defining plural sharp corner profiles, each said sharp corner profile including a plateau surface inward of said sharp corner profile perimeter edge portions.

6. A mold configuration for forming a pocket in a base film as claimed in claim 5, wherein inward edge surfaces extend between said sharp corner profile perimeter edge portions and said plateau surfaces of each said sharp corner profiles.

7. A mold configuration for forming a pocket in a base film as claimed in claim 6, wherein a transition wall surface extends between said bottom wall surface and said plateau surface of each said sharp corner profiles.

8. A mold configuration for forming a pocket in a base film as claimed in claim 7, wherein said wall surfaces further include side wall surfaces extending inward from said perimeter edge and merging with said transition wall surfaces, and said side wall surfaces, transition wall surfaces and bottom wall surface defining a fill volume sized to receive a delivered product component.

9. A mold configuration for forming a pocket in a base film as claimed in claim 6, wherein said plateau surfaces are disposed relative to the perimeter edge such as to limit elongation of the base film into the mold configuration from the film support surface to no more than twice its original area.

10. A mold configuration for forming a pocket in a base film as claimed in claim 6, wherein said sharp corner profiles include sharp corner edge portions defining acute and obtuse angles.

11. A mold configuration for forming a pocket in a base film as claimed in claim 6, wherein said plateau surface is continuous about said perimeter edge.

12. A mold configuration for forming a pocket in a base film as claimed in claim 7, wherein said inward edge surfaces of each sharp corner profile are disposed at ninety degrees (90°) to each other.

13. Apparatus for forming a pressurized product containment pouch from a base film and a lid film adhered about a perimeter seal seam comprising:

mechanism including a film support surface having at least one mold configuration therein, for forming a pocket in the base film comprising:

a perimeter edge at said film support surface;

wall surfaces extending inward from said perimeter edge defining a mold cavity;

said wall surfaces including a bottom wall surface and transition wall surfaces;

extending to said bottom wall surface, and at least one plateau surface within said mold cavity inward of said perimeter edge, mechanism supplying a base film onto said film support surface;

mechanism applying a vacuum to said mold configuration to cause said base film to form a pocket conforming to the shape of said mold cavity;

mechanism for filling said pocket with at least one product component;

mechanism for adhering a lid film to the base film on said film support surface.

14. The apparatus for forming a pouch from film as claimed in claim 13, wherein said perimeter edge includes sharp corner profile perimeter edge portions defining at least one sharp corner profile; and said wall surfaces include inward edge surfaces that extend between said sharp corner profile perimeter edge portions and said at least one plateau surface of said at least one sharp corner profile.

15. The apparatus for forming a pouch from film as claimed in claim 14, wherein one of said transition wall surfaces extends between said bottom wall surface and said plateau surface of said at least one sharp corner profile.

16. The apparatus for forming a pouch from film as claimed in claim 15, wherein said perimeter edge includes plural sharp corner profile perimeter edge portions defining plural sharp corner profiles, each said sharp corner profile including a plateau surface inward of said sharp corner profile perimeter edge portions.

17. The apparatus for forming a pouch from film as claimed in claim 14, wherein said mechanism including a film support surface comprises a rotatable base forming drum.

18. A method of forming a pouch having at least one sharp corner profile, using a mold configuration for forming a pocket in a film comprising: a film support surface; a perimeter edge at said film support surface; wall surfaces extending inward of said perimeter edge defining a mold cavity; said wall surfaces including transition wall surfaces extending to a bottom wall surface, and a plateau surface inward of said sharp corner profile perimeter edge portions;

the steps comprising:

supporting a base film on said film support surface overlying said mold configuration;

applying a vacuum to said mold configuration to cause said base film to form a pocket conforming to the shape of said mold configuration;

filling said pocket with at least one product component;

adhering a lid film to said base film laterally of said perimeter edge of said mold configuration.

19. A method of forming a pouch as claimed in claim 18, wherein:

wherein said plateau surfaces are spaced inward of said film support surface a distance sufficient to prevent adherence of a lid film to a base film overlying said plateau surfaces.

20. A method of forming a pouch as claimed in claim 19, wherein during said forming step said film overlying said plateau surfaces is stretched less than twice its original area.

21. A method of forming a pressurized product containment pouch having a base film and a lid film adhered about a perimeter seal seam using a mold configuration having a film support surface;

perimeter edge at said film support surface;

wall surfaces extending inward from said perimeter edge defining a mold cavity;

said wall surfaces including a bottom wall surface and transition wall surfaces extending to said bottom wall surface; and at least one plateau surface within said mold cavity, inward of said perimeter edge;

the steps comprising:

supporting a base film on said film support surface overlying said mold configuration;

applying a vacuum to said mold configuration to cause said base film to form a pocket conforming to the shape of said mold configuration;

filling said pocket with at least one product component;

adhering a lid film to said base film laterally of said perimeter edge of said mold configuration.

22. A method of forming a pressurized product containment pouch having a base film and a lid film adhered about a perimeter seal seam, as claimed in claim 21;

wherein said at least one plateau surface is spaced inward of said film support surface a distance sufficient to prevent adherence of the lid film to the base film overlying said at least one plateau surface.

23. A method of forming a pouch as claimed in claim 22, wherein during said step of forming said base film, said film overlying said plateau surfaces is stretched less than twice its original area.

* * * * *